United States Patent
Pratt

[19]

[11] Patent Number: 6,134,709
[45] Date of Patent: Oct. 17, 2000

[54] METHOD AND APPARATUS FOR PARSING COMMANDS

[75] Inventor: Richard Pratt, Danville, Calif.

[73] Assignee: Cisco Technology, Inc., San Jose, Calif.

[21] Appl. No.: 09/106,923

[22] Filed: Jun. 29, 1998

[51] Int. Cl.[7] .................................................. G06F 9/45
[52] U.S. Cl. .................................................. 717/8; 707/4
[58] Field of Search ................................ 395/708, 701; 345/338, 336; 707/531, 3, 4; 704/9; 717/8, 1

[56] References Cited

U.S. PATENT DOCUMENTS

| | | | |
|---|---|---|---|
| 5,485,618 | 1/1996 | Smith | 395/338 |
| 5,680,622 | 10/1997 | Even | 395/709 |
| 5,790,863 | 8/1998 | Simonyi | 395/707 |
| 5,798,757 | 8/1998 | Smith | 345/338 |
| 5,960,384 | 9/1999 | Brash | 704/9 |
| 5,963,742 | 10/1999 | Williams | 395/708 |

OTHER PUBLICATIONS

Shilling, John J., "Incremental LL(1) Parsing in Language–Based Editors," IEEE Transaction on Software Engineering, vol. 19, Issue 9, pp. 935–940, Sep. 1993.

Nemeth–Johannes, Jay, "A Standardized Instrument Programming Language Based on IEEE Std. 488.2," Conference Record of 7th IEEE IMTC–90, pp. 306–310, Feb. 13–15, 1990.

Chu et al., "A Top–down Parsing Co–processor for Compilation," Proceedings of the Twenty–Second Annual Hawaii International Conference on System Sciences, vol. 1, pp. 403–413, Jan. 3–6, 1989.

*Primary Examiner*—Tariq R. Hafiz
*Assistant Examiner*—Tuan Q. Dam
*Attorney, Agent, or Firm*—Charles E. Gotlieb

[57] ABSTRACT

A method and apparatus parses a command using a tree of acceptable command tokens. Each token is matched to a node in the tree, and upon discovering a match, descendant nodes of the matched node are used to parse the remaining tokens in the command received. When the command is fully parsed, or as the command is being parsed, pointers to nodes of the tree corresponding to a command parsed are stored along with a token from each such node matching the command token for use by the next command to be parsed. When the next command is received, the stored tokens are compared with each command token in the command until the tokens do not match the command token. The remainder of the command token is then parsed using the tree starting with the node corresponding to the last stored token that matched a command token.

22 Claims, 7 Drawing Sheets

METHOD AND APPARATUS FOR PARSING COMMANDS

FIELD OF THE INVENTION

The present invention is related to computer software and more specifically to computer software for parsing commands.

BACKGROUND OF THE INVENTION

Some computer software is operated by the use of commands. Each command contains one or more tokens. A token is a part of a command that may be made up of one or more characters, including spaces.

For example, the commands "Go to the store" and "Go to the park" are two commands that could be interpreted by an individual. The first token "Go" can be followed by the second token "to the store" to indicate an acceptable command. "Sit down" is yet another acceptable command with tokens "sit" and "down". However, "Sit to the store" is not an acceptable command.

When a command is received by computer software, the computer software attempts to determine what action is indicated by the command. One way of performing this function is to compare the command submitted with a list of acceptable commands. Each acceptable command in the list may also contain an action that is to be performed to carry out the command. If the submitted command matches an acceptable command, the corresponding action of the acceptable command is performed to execute the submitted command.

While such a system can assist the computer software in carrying out the submitted commands, it can have several drawbacks. First, the more acceptable commands there are, the longer it can take to search all of them in order to match the submitted command. Second, if the number of acceptable commands is large, it can require a great deal of storage space to store all acceptable commands.

The list of acceptable commands can be stored in a tree structure to reduce the space required to store all of the acceptable commands. The root nodes of the tree can contain acceptable first tokens in a command. In the example, above, "Go" and "Sit" are acceptable first tokens. The tree can store one of these tokens in each of the two root nodes. The tokens, "to the store" and "to the park" are acceptable second tokens, but only for those commands following the token "Go". To indicate this relationship, nodes containing "to the store" and "to the park" may be stored as descendant nodes of the node containing the token "Go". This structure can reduce the overall storage space required to store acceptable commands, because "Go" is only stored once, even though it can be used in two acceptable commands. The other root node containing the token "Sit" has only one descendant node containing the token "down" to indicate "Sit down" is an acceptable command. The tree can be searched to match the submitted command, token by token. The process can stop after the first match is found, or if multiple matches are possible, after the tree has been fully searched for all matching acceptable commands for the submitted command.

The tree structure can be used to simplify the search for acceptable commands. If a submitted command is "Sit down", comparing the first token "Sit" in the submitted command, with the first root node "Go" will result in no match. It is not necessary to attempt to match the second token in the submitted command with the tokens of the descendant nodes of the node containing the token "Go" because an acceptable command will not result due to the lack of a match with the tokens in the root node. Thus, searching time for a matching acceptable command can be less than attempting to match all acceptable commands.

The tree structure can even assist in matching the tokens. Each node can contain a function that determines whether the token in the submitted command matches the acceptable tokens for the node. The node can approve even partial matches between the submitted token and the acceptable token, allowing "store" to match "to the store". This allows commands to be shortened by frequent users of the computer program who know how to provide terse commands. Thus the submitted command "Go store" will cause the computer program to perform the same action as the submitted command "Go to the store".

Although the method described above can work better than searching all of the acceptable commands, it may still have problems associated with it. Some computer programs can have hundreds of acceptable commands, so even using the structure and method described above can take an unacceptably long amount of time.

Often, commands will be received in groups, with each command in the group differing only slightly from other commands in the group. For example, assume a tree of acceptable commands with the root nodes having one of the tokens "A" through "Z", descendant nodes of node Z are nodes having one of the tokens "A1" through "Z1", descendant nodes of the node with the token "Z1" include nodes containing one of the tokens "a" through "z" and descendant nodes of the node containing the token "z" contain one of the tokens "a2" through "z2". Assume for example a first submitted command received is "Z Z1 z y2". There may be a high probability that the second submitted command will begin with the same tokens, such as the submitted command "Z Z1z z2". After receiving and matching the first command with an acceptable command, matching the second submitted command with an acceptable command requires searching the tree again starting at the first root node, for example, at the node having a matching token A. Comparing the first token in the submitted command "Z" with the token "A" stored in the first root node will fail, as will the other comparisons "B" through "Y".

What is needed is a method and apparatus that can efficiently attempt to match to an acceptable command a submitted command that follows a similar submitted command.

SUMMARY OF INVENTION

A method and apparatus parses the first submitted command received using a tree and conventional parsing methods described above. The method and apparatus stores identifiers such as tokens of, and pointers to, nodes that matched the first submitted command received. To parse the next submitted command, each token of that submitted command is compared with the corresponding token of each node stored from the prior command until no match occurs between the stored tokens and the command. The tree and conventional methods are used to parse the received command beginning with a descendant node of the node corresponding to the last matching stored token. The nodes that matched the second command are stored and used to match the third command received and so on.

DETAILED DESCRIPTION OF A PREFERRED EMBODIMENT

Figure 1:
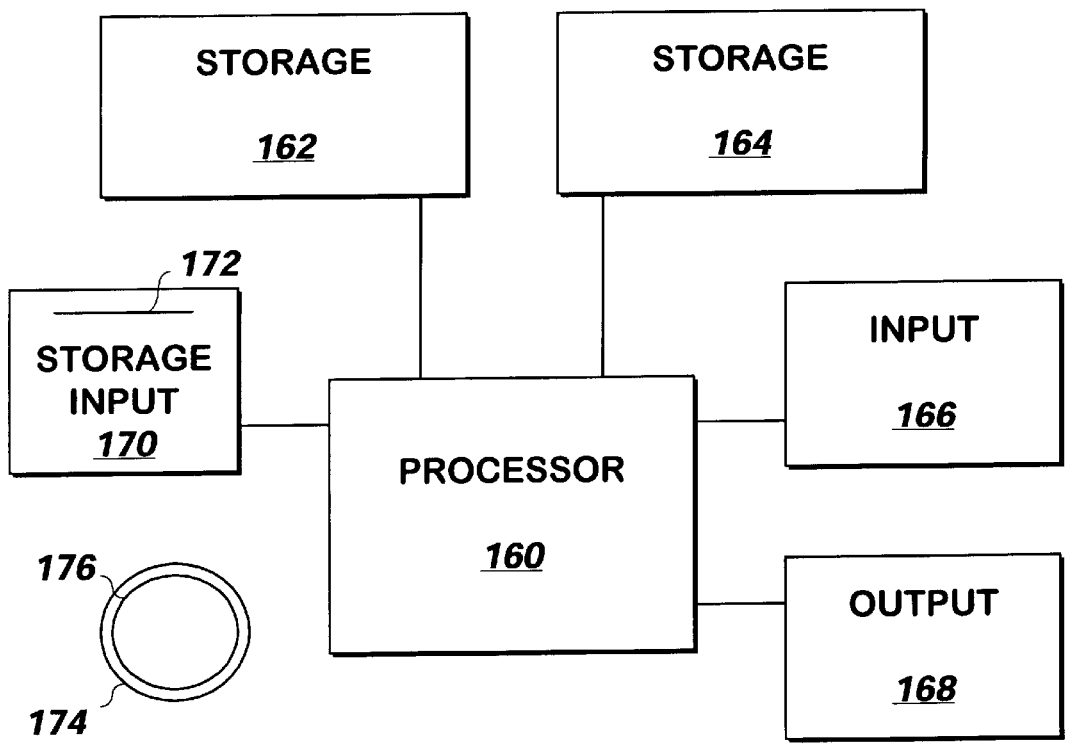
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional IBM-compatible personal computer running the Windows 95 operating system commercially available from Microsoft Corporation of Redmond Washington, although other systems, such as the model 7500 router running the IOS operating system, both commercially available from Cisco Systems, Inc., of San Jose Calif., may be used.

Figure 2:
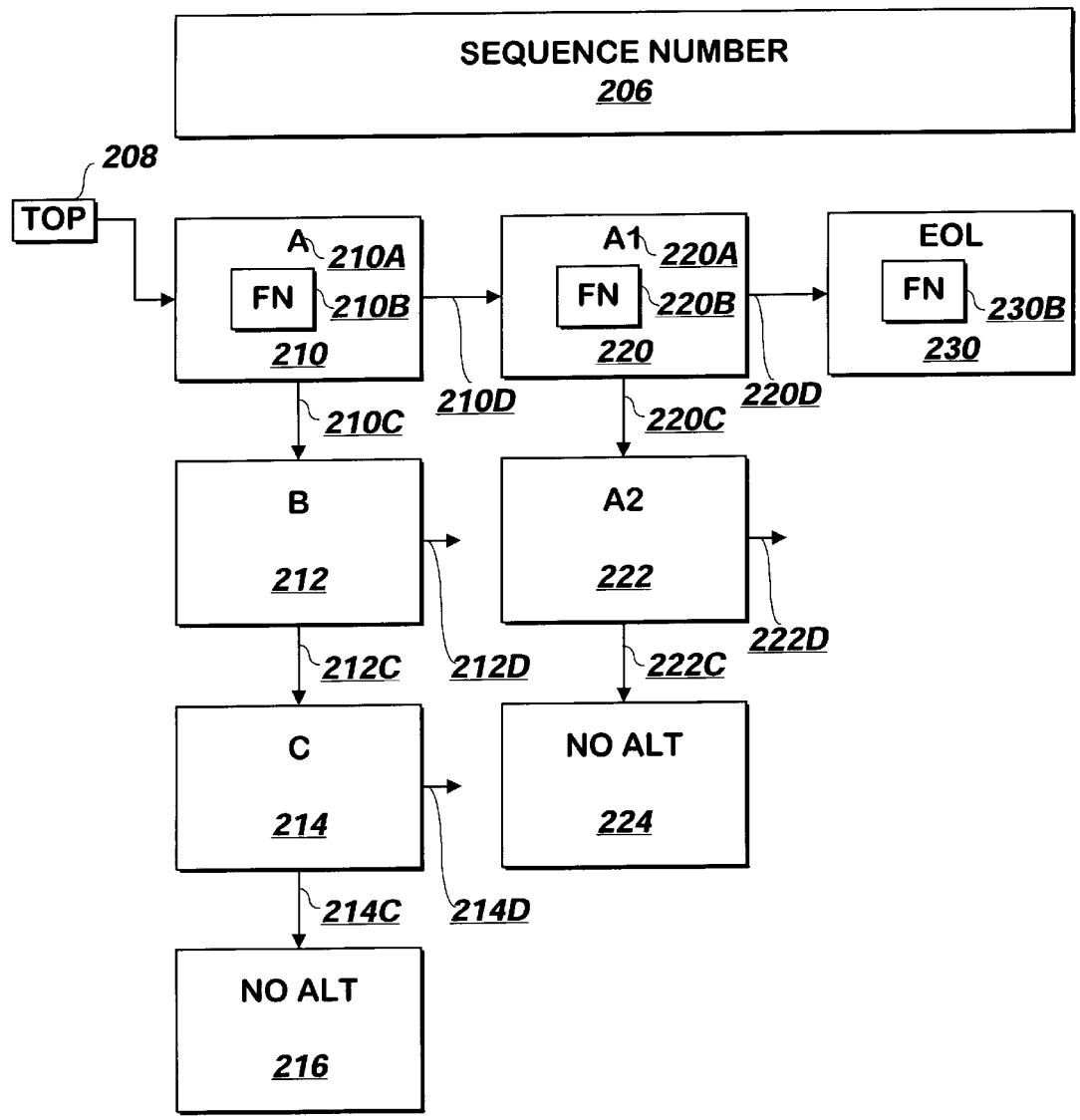
FIG. 2 is an illustration of a tree data structure used by one embodiment of the present invention.

Referring now to FIG. 2, one embodiment of a tree structure which may be used by the present invention is shown. The tree structure shown in FIG. 2 is not the only structure that may be used by the present invention, however it is one example of a structure that can facilitate operation of the present invention.

Nodes 210, 220, 230, 212, 222, 214, 224, 216 are connected by pointers to other nodes, also referred to as "transitions" 210C, 210D, 220C, 220D, 212C, 212D, 222C, 222D, 214C, 214D. In FIG. 2, some transitions 212D, 222D, 214D are illustrated but the nodes to which the transitions 212D, 222D, 214D are pointing are not illustrated. Each node 210, 220, 230, 212, 222, 214, 224, 216 may contain a function or a pointer to a function, a token and two transitions. FIG. 2 illustrates the function and tokens of nodes 210 and 220, and the function of node 230, but the functions and/or tokens of other nodes are not illustrated to avoid cluttering the Figure. Each function 210B or 220B can be executed to identify whether a token in a command received matches the token 210A, 220A. Each function 210B, 220B, 230B may contain either an actual function stored as part of the node, or may contain a pointer to, or other identifier of, a function stored elsewhere.

Each node 210, 220, 230, 212, 222, 214, 224, 216 may have an "accepting transition", an "alternate transition", both or none. The accepting transition identifies a child node which may be used as a starting point to parse the remainder of a command if the function corresponding to the node indicates the command or portion of the command matches the token of the node. For example, transition 210D is an accepting transition of node 210. If function 210B indicates a command received matches token 210A, parsing continues using node 220. If function 210B indicates the command received does not match the token 210A, the alternate transition of node 210 is used to continue parsing the command received. Alternate transitions point to one other sibling node so that all sibling nodes are connected by alternate transitions in a daisy-chain fashion. In FIG. 2, the alternate transition of node 210 is transition 210C. Node 230 is an "EOL" node. An EOL node pointed to by an accepting transition indicates parsing of the command is complete if a carriage return is found in the submitted command at this point. The function 230B of the node 230 pointed to via the accepting transition 220D of the prior node is executed to perform the command received. Thus, if the submitted command received reads "A A1", the command may be matched using the tree by starting with a pointer to the top of the tree. The function 210B is executed to compare the command received against the token 210A in node 210. The function 210B identifies a match, and the accepting transition 210D is used to locate the next node 220 to be used to parse the next token of the submitted command received. The function 220B is executed and matches the submitted command received with the token 220A. (If function 220B did not identify a match between the corresponding token in the command and token 220A, the alternate transition 220D would be used to locate the next node). The accepting transition 220D is used to identify the next sibling node 230. The function 230B is executed, and if the submitted command has no more tokens, the function provides an indicator of instructions that can execute the command corresponding to "A A1". Function 230B can also store a list of the nodes 220, 210 from which node 230 descended, and the tokens 220A, 210A which are contained by those nodes 210, 220.

Sequence number storage 206 stores a unique identifier of the version of the tree of FIG. 2. This allows new versions of the tree to be distinguished from older versions of the tree. For example, if node 214 is added to the tree, the sequence number stored in sequence number storage 206 may be incremented and stored back into sequence number storage 206.

Figure 3:
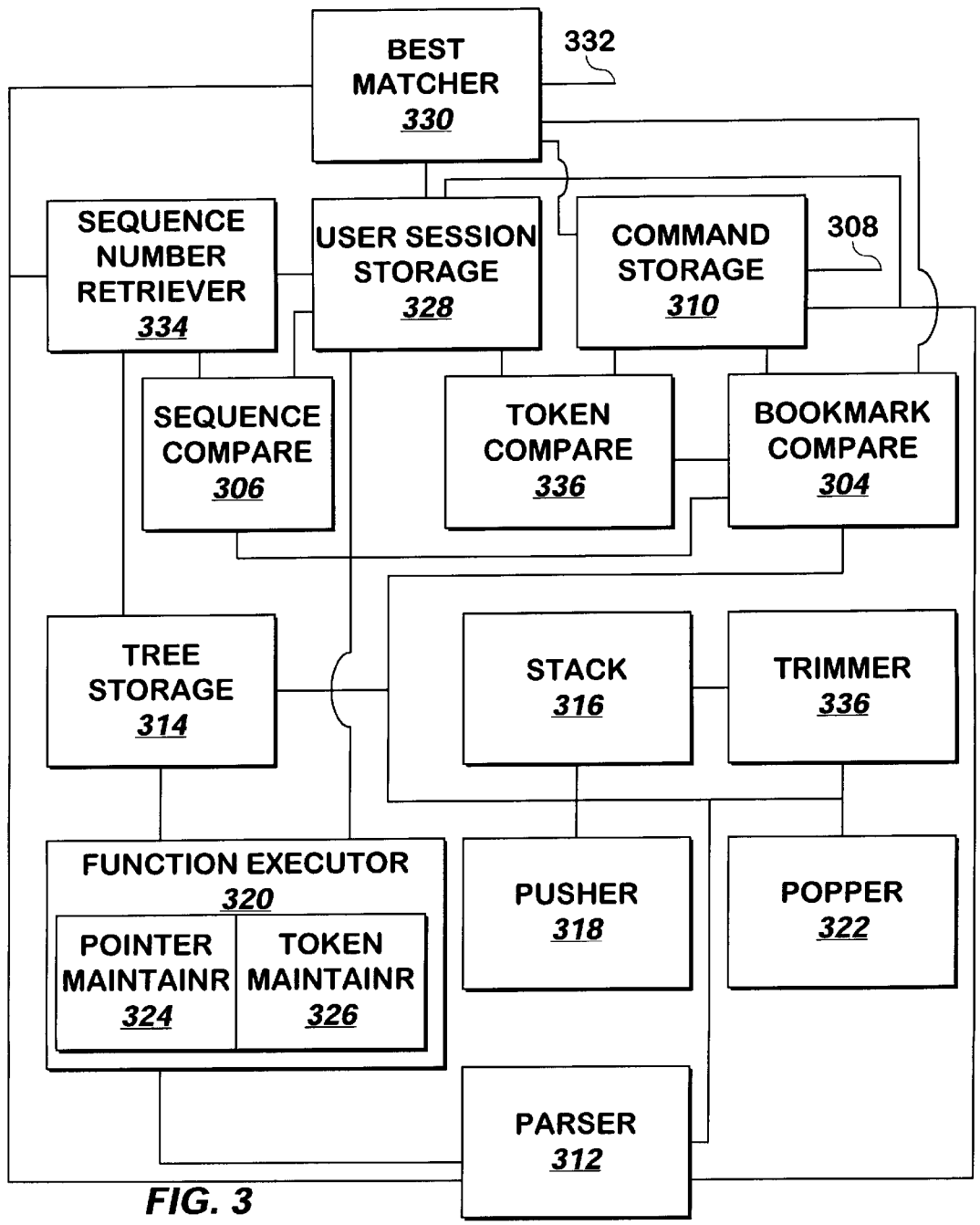
FIG. 3 is a block schematic diagram of an apparatus for parsing commands according to one embodiment of the present invention.

Referring now to FIG. 3, an apparatus for matching submitted commands received, for example from a user, to acceptable commands stored in a tree is shown according to one embodiment of the present invention. A command is received from a user at input 308 and stored in command storage 310. A tree that describes all acceptable commands as described above is stored in tree storage 314. Tree storage 314 and command storage 310 may be any conventional storage device, such as memory or disk storage.

Command storage 310 signals bookmark compare 304 upon receipt of the command. Bookmark compare 304 signals sequence compare 306 to compare the sequence number of the tree stored in tree storage 314 with the sequence number previously stored in user session storage 328. Upon initialization, user session storage 328 contains a null sequence number. This null sequence number will not match the sequence number of the tree stored in tree storage 314. Alternately, the prior bookmark could be stored as all nulls, and bookmark compare 304 detects that status. Alternately, bookmark compare 304 could detect, instead of comparing, the null sequence number.

As a result of the sequence number not matching or the bookmark or sequence number detected as null, upon receipt of the first command by command storage 310, sequence compare 306 signals bookmark compare 304 that the sequence numbers do not match. When the sequence numbers do not match, bookmark compare 304 sends the command to parser 312, which parses the command stored in command storage 310 as described below.

Parser 312 receives the command from command storage 310 and checks it against the tree of acceptable commands stored in tree storage 314 as described below. Parser 312 uses stack 316 to store pointers to nodes in the tree in order to keep its place in the tree as it attempts to parse the command. Command storage initializes stack 316 with a pointer 208 to the top of the tree.

Parser 312 direct popper 322 to pop the top of the stack 316 and pass the resulting pointer to parser 312. Parser 312 uses the pointer received from popper 322 to obtain the alternate transition corresponding to the pointer received from popper 322. Parser 312 directs pusher 318 to push this alternate transition onto stack 316. Parser 312 passes the command received from command storage 310 and the pointer received from popper 322 to function executor 320. Function executor 320 retrieves this function from tree storage 314 as indicated by the pointer it receives from parser 312 and executes the function. The result of the function is either a match or not a match. The result of the function is returned by function executor 320 to parser 312.

If the result of the function is not a match, parser 312 repeats the steps described beginning with the paragraph above. If the execution of the function resulted in a match, parser 312 retrieves from tree storage 314 the accepting transition corresponding to the pointer received from popper 322 as described above, and passes the pointer to pusher 318. Pusher 318 pushes this accepting transition onto stack 316 and signals parser 312, which repeats the steps described beginning with the paragraph above.

In one embodiment, a pointer stored in bookmark compare 304 and parser 312 is used to keep track of the portion of the submitted command already matched. Bookmark compare initializes the pointer to point to the first character in the command (leading spaces may optionally be stripped off by bookmark compare 304 by pointing to the first nonspace character in the submitted command.) The pointer is passed with the submitted command from bookmark compare 304 to parser 312. When a token matches the submitted command, the pointer is advanced past the matching token. For example, in the command "Go to the store", when "Go" is matched, a pointer is advanced to point to the start of "to the store" portion of the submitted command. Old pointers are also maintained and restored by parser 312 in place of the current pointer if or when a no-alt node is reached. Parser 312 also maintains the series of transitions to nodes having a function that matched the submitted command, and the token that matched. In one embodiment, the function 210B, 220B or 230B provides the token and transition to token maintainer 324 and pointer maintainer 324 when a match occurs, and in another embodiment, parser 312 retrieves the token from the submitted command and uses the transition last received from popper 322. Again, the most recent matching token and transition are removed from the list of matching tokens and transitions by parser 312 when a pointer to a no-alt node is popped from stack 316.

When a pointer to an EOL node is popped from the stack 316 and the submitted command has no more tokens, parser 312 stores the transitions and tokens in the list of matching tokens and transitions into user session storage 328 for use as described below. In one embodiment, parser 312 only stores the first two transitions and tokens. Storing less than all of the transitions and tokens can capture much of the benefits of the present invention if the number of descendants in the tree descending from the last node having a transition stored is relatively small.

Parser 312 signals sequence number retriever 334, which retrieves the sequence number from the tree in tree storage 314 and stores it in user session storage 310 along with the tokens and transitions stored in user session storage 328 as described above.

In one embodiment, parser 312 does not stop parsing the tree after the first EOL node is reached, indicating that the submitted command has been fully identified, to allow for the possibility that the submitted command matches the set of tokens that serve to match multiple acceptable commands. For example, submitted commands will attempt to match on the first few letters of a token, the submitted command "Go to" will match the acceptable commands "Go to the store" and "Go to the park". Thus, the first EOL node reached may not be the only EOL node that could be reached. In such embodiment, multiple sets of matching tokens and transitions may be stored in user session storage 328, and parser continues operation as described above even after a transition to an EOL node is popped from stack 316. In such embodiment, parser 312 may signal sequence number retriever 334 to retrieve and store the sequence number of the tree only once after the stack 316 is empty and parsing is complete.

In another embodiment, parser 312 stops trying to match the submitted command after the transition to the first EOL node is detected for storage onto the stack or is popped from the stack.

If a transition is popped from the stack that points to an EOL node or a No-Alt node, parser 312 does not initiate the pushing onto stack 316 of an accepting transition or alternate transition for the EOL or no-alt node. In one embodiment, no EOL or no-alt nodes exist in the tree at all, but are signified by transitions having a value marking the transition as pointing to such a node-type. In another embodiment, transitions to EOL nodes and no alt nodes are detected by parser 312 and not pushed onto the stack.

When the stack is empty, or if only one acceptable command is allowed, after that one command is matched, parser 312 signals best matcher 330.

If multiple sets of transitions and tokens corresponding to multiple matching acceptable commands exist in user session storage 328, best matcher 330 provides via input/output 332 a message to the user indicating that more information is required to uniquely identify the acceptable command matching the submitted command. Best matcher 332 may retrieve from command storage 310 the submitted command and from the user session storage 328 the possible acceptable commands, and may use the tokens stored to identify the first point at which the submitted command is ambiguous, and indicate to the user the divergence between the various acceptable commands or the ambiguous portion of the submitted command. In one embodiment, the user can use input/output coupled to a conventional keyboard/mouse/monitor to indicate which acceptable command was intended or to indicate that none of the acceptable commands is the one intended. Best matcher 330 removes from user session storage 328 the transitions and tokens corresponding to the acceptable commands not indicated. In another embodiment, best matcher 330 provides at input/output 332 the submitted command and a rejection message, clears all of the transitions and tokens from user session storage 328 and the user can resubmit a more complete submitted command at input 308.

After a prior submitted command that matches an acceptable command had been submitted and matches as described above, when a subsequent command is received by command storage 310 via input 308, user session storage 328 will have stored the best matching transitions and tokens from the prior command, and the sequence number of the tree at the time such transitions and tokens were stored. Command storage 310 signals bookmark compare 304. Bookmark compare 304 signals sequence compare 306. Sequence compare 306 signals sequence number retriever 334, which retrieves the current sequence number from the tree in tree storage 314. Sequence number retriever 334 passes this sequence number to sequence compare 306. Sequence compare 306 compares the sequence number retrieved by sequence number retriever 334 with the sequence number stored in user session storage 328. If the tree was updated after the prior command was parsed, the sequence numbers will not match. As a result sequence compare 306 signals bookmark compare 304, which signals parser 312 to parse the command as described above.

If the sequence numbers match, sequence compare 306 signals bookmark compare 304. Bookmark compare 304 retrieves the first pointer from user session storage 328. Bookmark compare 304 retrieves from tree storage the alternate and accepting transitions for the node pointed to by the pointer retrieved from user session storage 328. Bookmark compare 304 passes the alternate transition to pusher 318, which pushes the alternate transition onto stack 316. Bookmark compare 304 passes the accepting transition to pusher 318, which pushes the accepting transition onto stack 316.

Bookmark compare 304 initiates the comparison of the token stored in user session storage 328 with the corresponding token of the command stored in command storage 310. In one embodiment, a separate token compare 336 is used to perform this comparison. Token compare 336 locates in user session storage 328 the token corresponding to the pointer provided by bookmark compare 304. Token compare 336 compares the token retrieved from user session storage 328 with corresponding token of the command in command storage 310. If token compare 336 determines the token retrieved from user session storage 328 matches the corresponding portion of the command stored in command storage 310, token compare 336 signals bookmark compare 304.

Another way of comparing the token stored in user session storage 328 with the corresponding portion of the submitted command stored in command storage 310 is performed in another embodiment of the present invention. Bookmark compare retrieves from user session storage 328 the transition stored in user session storage 328. Bookmark compare 304 signals function executor 320 by passing the pointer received from user session storage 328 and the command from command storage 310. Function executor 320 retrieves the function from tree storage 314, performs the function on the command, and because the request was received from bookmark compare 304, returns only an indication of whether the command would have been accepted by the function.

If the token matches the command received by command storage 310 (or the function results in a match on the command received by command storage 310), bookmark compare 310 signals trimmer 336. Trimmer 336 trims the stack 316 by removing the sibling pointer immediately below the top of the stack 316. In one embodiment, trimmer 336 trims the stack by signaling popper 322 to pop the stack. Popper 322 pops stack 316 and returns the pointer popped from the stack to trimmer 336. Trimmer 336 stores this pointer and signals the popper 322 to pop the stack 316 again. Popper 322 pops stack 316 and returns the pointer to trimmer 336. Trimmer 336 discards this second pointer and provides the first pointer provided by popper 322 to pusher 318. Pusher 318 pushes the first pointer popped by popper 322 back onto the stack 316.

In an alternate embodiment of the present invention, bookmark compare 304 does not push transitions onto the stack until after the token is compared to the submitted command. In such embodiment, if the token matches the current location in the submitted command as described above, only the accepting transition is pushed via pusher 318 onto the stack 316 and if the token doesn't match, first the alternate, and then the accepting transitions are pushed via pusher 316 onto the stack 316. This operation achieves the same effect as the pushing/trimming operation described above.

Bookmark compare 304 repeats this process until all tokens in the command match the tokens stored, or a token in the command does not match the corresponding token stored in user session storage 328. If the command tokens match all the saved tokens, bookmark compare 304 signals best matcher 330 to output the pointer again.

If the token does not match command received by command storage 310 (or the function does not result a match on the command received by command storage 310), bookmark compare 304 signals parser 312 and passes the pointer to a position past the position in the submitted command which matched the last token in user session storage 328 as described above. Additionally, bookmark compare 304 passes a level, which indicates the "generation" in the tree on which the last token match was made. If the submitted command does not match any of the tokens saved in user session storage 328, bookmark compare passes a level of zero, if only the first token matched, bookmark compare passes a level of one, and so on.

Parser 312 performs the operations described above using the stack 316 that was modified by bookmark compare 304 as described above. The tokens and transitions identified as a result of the actions of the parser 312 are substituted in user session storage 328 by the maintainers 324, 326 of function executor 320 in place of the non matching tokens and their corresponding pointers beginning with the first non-matching token as identified by the level received and maintained (e.g. by incrementing as matches are identified and decremented as transitions to no alt nodes are identified) by parser 312. Function executor 320 receives the level from parser 312 and uses the level to store the pointer and token at the proper location in user session storage 328. The result is that if the initial portions of the command or all of the command matches some or all of the tokens stored in user session storage 328, matching the command received at input 308 occurs more rapidly and alternate transitions corresponding to nodes that matched are not used to parse the command.

In one embodiment, a memory (not shown) contains functions or procedures that perform a submitted command that matches an acceptable command. Each node in the tree that has an accepting transition to an EOL node contains an identifier of the function or procedure corresponding to the matching acceptable command. Best matcher 330 retrieves from tree storage 314 the identifier of the function or procedure prior to providing the other information from the parsed command at output 332 and provides at output 332 the identifier of the function or procedure to perform in order to execute the submitted command.

Figure 4A:
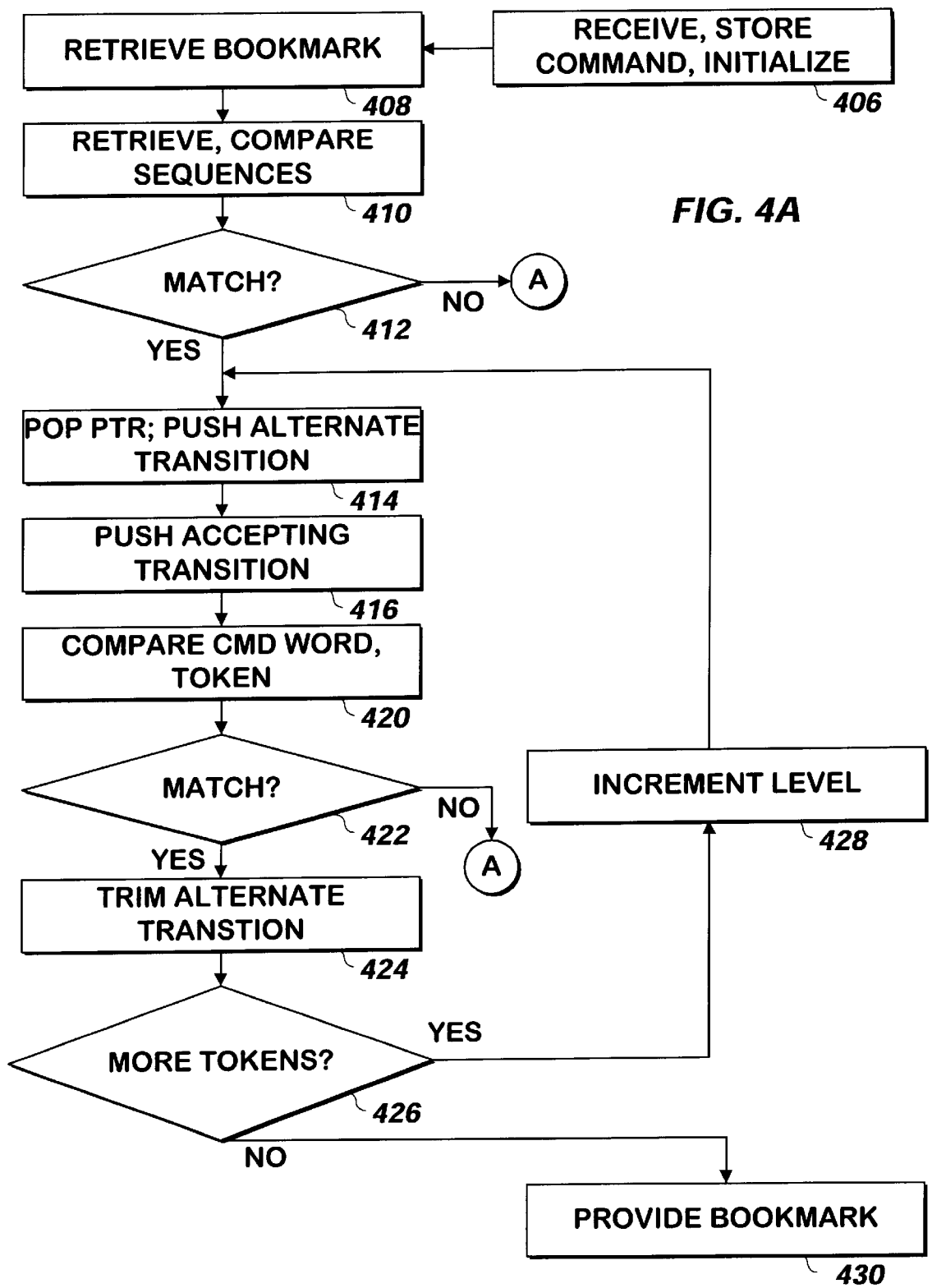
FIG. 4A is a flowchart illustrating a first portion of a method of parsing commands according to one embodiment of the present invention.

Referring now to FIG. 4A, a method of parsing a command is shown according to one embodiment of the present invention. A command is received and optionally stored 406. In one embodiment, step 406 also includes initializing a stack to contain a pointer to the top of a current version of the tree. Additionally, a level counter is initialized to a value of "0" to keep track of the current token in the command.

One or more bookmarks are retrieved 408. In one embodiment, a bookmark contains a set of pointers, or other indicators, and tokens corresponding to some or all of the pointers. In addition, a bookmark contains a sequence number or other indicator of the version of the tree from which the pointers in the bookmark were retrieved.

In one embodiment, each pointer points to a node in a tree, although other data structures may be used by the present invention. Some or all of the nodes contain an accepting transition, an alternate transition, a token and a function as described above.

Figure 4B:
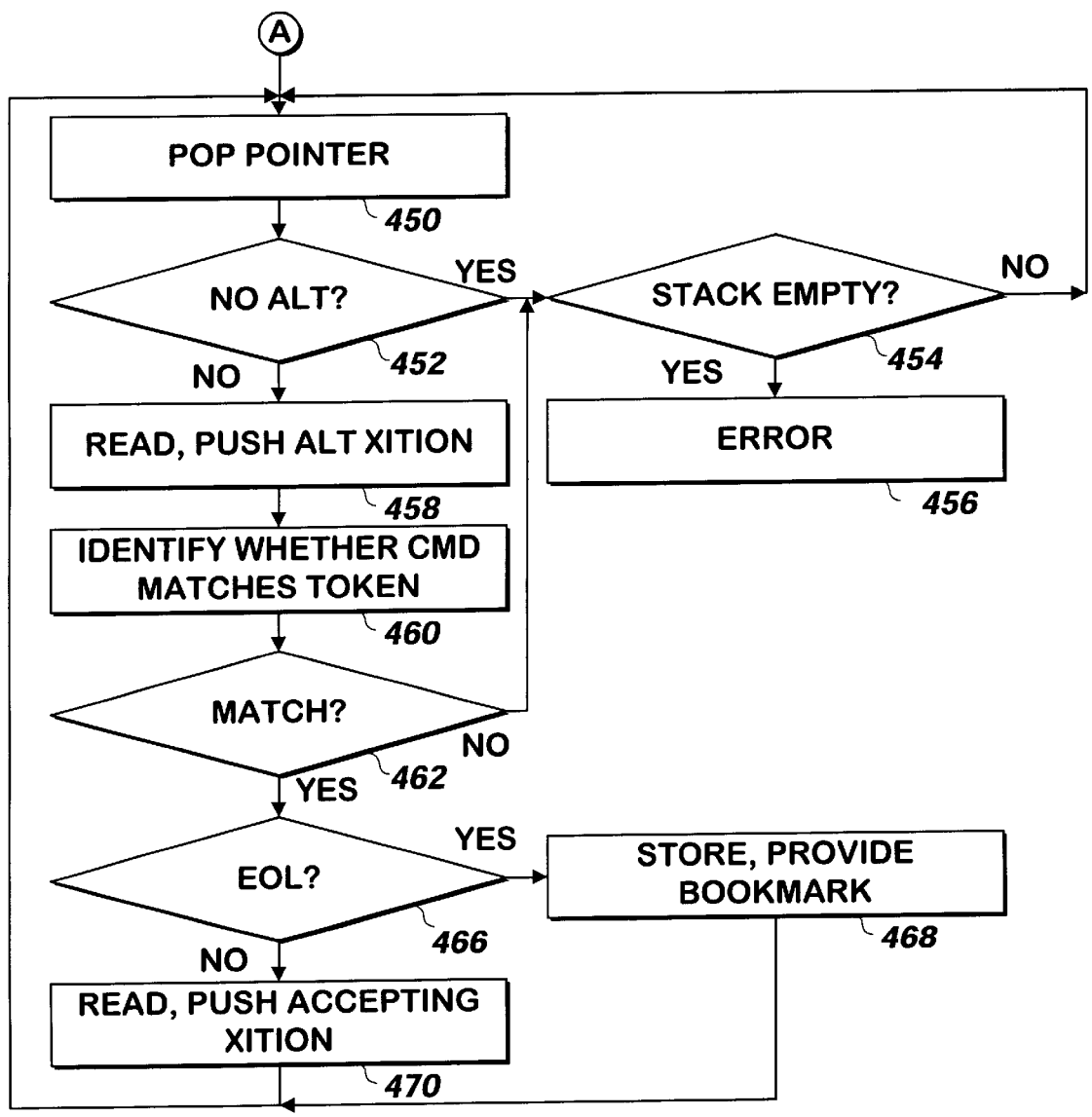
FIG. 4B is a flowchart illustrating a second portion of the method of parsing commands began in FIG. 4A or 4C according to one embodiment of the present invention.

In one embodiment, the sequence number of a current version of a tree is retrieved and compared 410 to the sequence number of the bookmark retrieved in step 408. If the sequence numbers retrieved and compared in step 410 match 412, the method continues at step 414. Otherwise, the method continues at step 450 of FIG. 4B, described below. If the tree never changes, it is not necessary to retrieve and compare sequence numbers as described above. In addition, if older versions of the tree are maintained, instead of the "no" alternative of step 412 leading to the steps shown in FIG. 4B, such older version may be located. This older version may then be used by subsequent steps of FIGS. 4A and 4B, provided the use of older versions of the tree is acceptable and a better alternative than parsing the newer version of the tree as shown in FIG. 4B.

The pointer on the stack is popped 414, and the alternate transition for the node pointed to by this pointer is located, for example in the tree, and pushed onto the stack 414. The accepting transition for this node is similarly located and pushed onto the stack 416. The command token corresponding to the level is compared to the token from the bookmark corresponding to the level 420. If the command token and token compared in step 420 match 422, the method continues at step 424. Otherwise, the method continues at step 450 of FIG. 4B.

The alternate transition is trimmed from the stack 424, for example by popping the accepting transition and then the alternate transition from the top of the stack, and pushing the accepting transition back onto the stack.

Figure 4C:
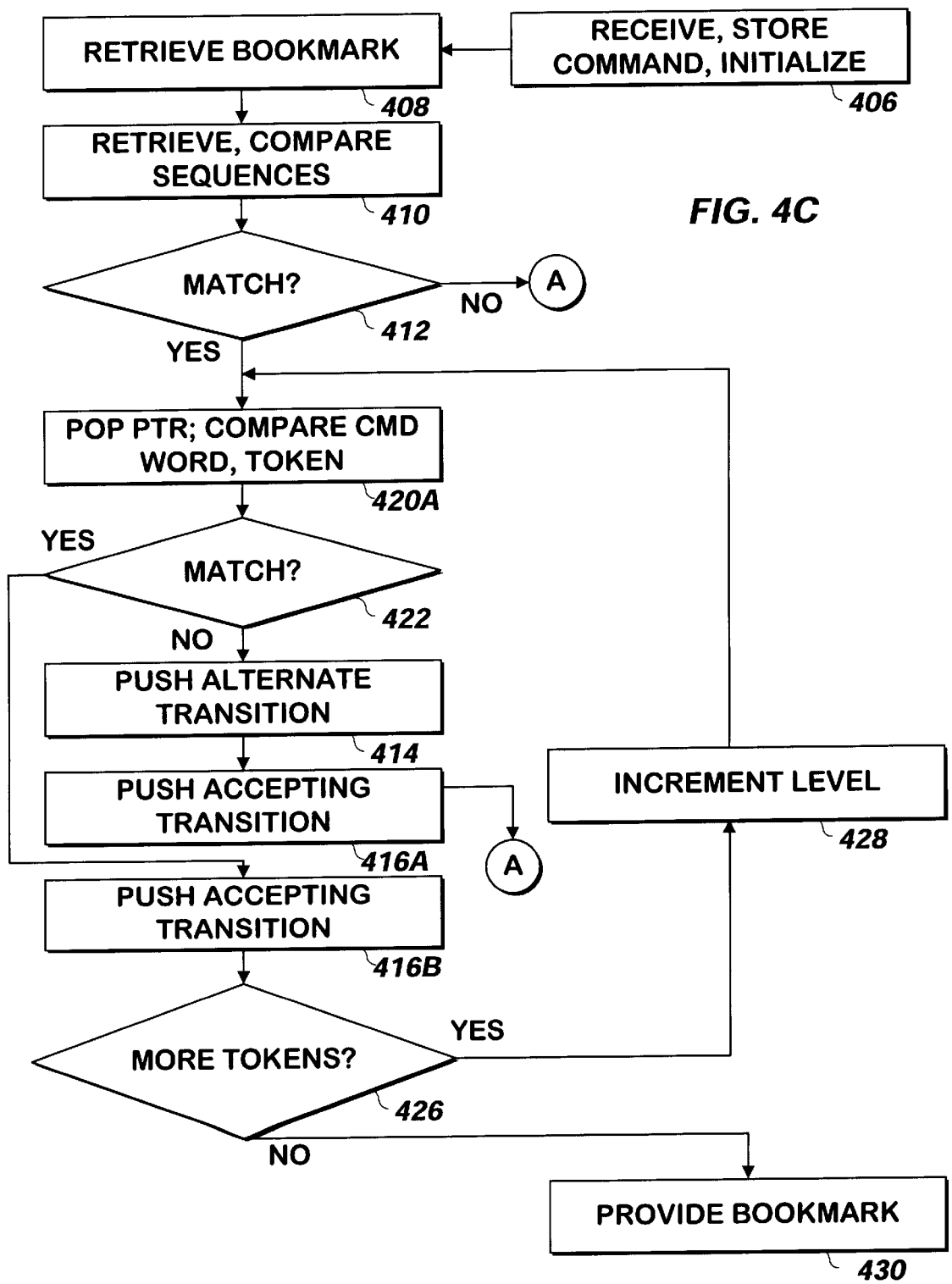
FIG. 4C is a flowchart illustrating a first portion of a method of parsing commands according to an alternate embodiment of the present invention.

As described above, in an alternate embodiment of the present invention illustrated in FIG. 4C, steps 414 and 416 may be performed after step 422, and step 420A includes the comparison of step 420 of FIG. 4A as well as popping the transition to the next node that was performed in step 414 of FIG. 4A. If a match occurs 422 between the submitted command and the token of the node popped in step 420A, the accepting transition is pushed 416B onto the stack and the method continues at step 426, with step 424 of FIG. 4A omitted from FIG. 4C. If no match occurs 422, the alternate transition 414 and then the accepting transition 416B are pushed onto the stack and the method continues at step 450 of FIG. 4B. The other steps of FIG. 4C operate as described above with respect to FIG. 4A.

If there are additional tokens to the bookmark 426, the level counter is incremented 428 and the method continues at step 414. Otherwise, the method terminates 430 by providing some or all of the bookmark retrieved in step 408. In one embodiment, step 430 includes retrieving and providing an identifier of a function or procedure to execute to perform the command corresponding to the bookmark provided.

Referring now to FIG. 4B, the method shown in FIG. 4A is continued. The pointer at the top of the stack is popped 450. If the pointer points to a no-alt node 452, and if the stack is not empty 454, the method continues at step 450, otherwise, an error message or other indication may be provided 462. If pointer popped in step 450 does not point to a no-alt node 452, the method continues at step 458. The pointer popped in step 450 points to a node, and the alternate transition of this node is read and pushed onto the stack 458. Some or all of the command is identified to determine whether or not the node pointed to by the pointer popped in step 450 can accept the command as a matching command 460. In one embodiment, step 460 is performed by executing a function stored with reference to the node having the pointer popped in step 450.

Figure 4D:
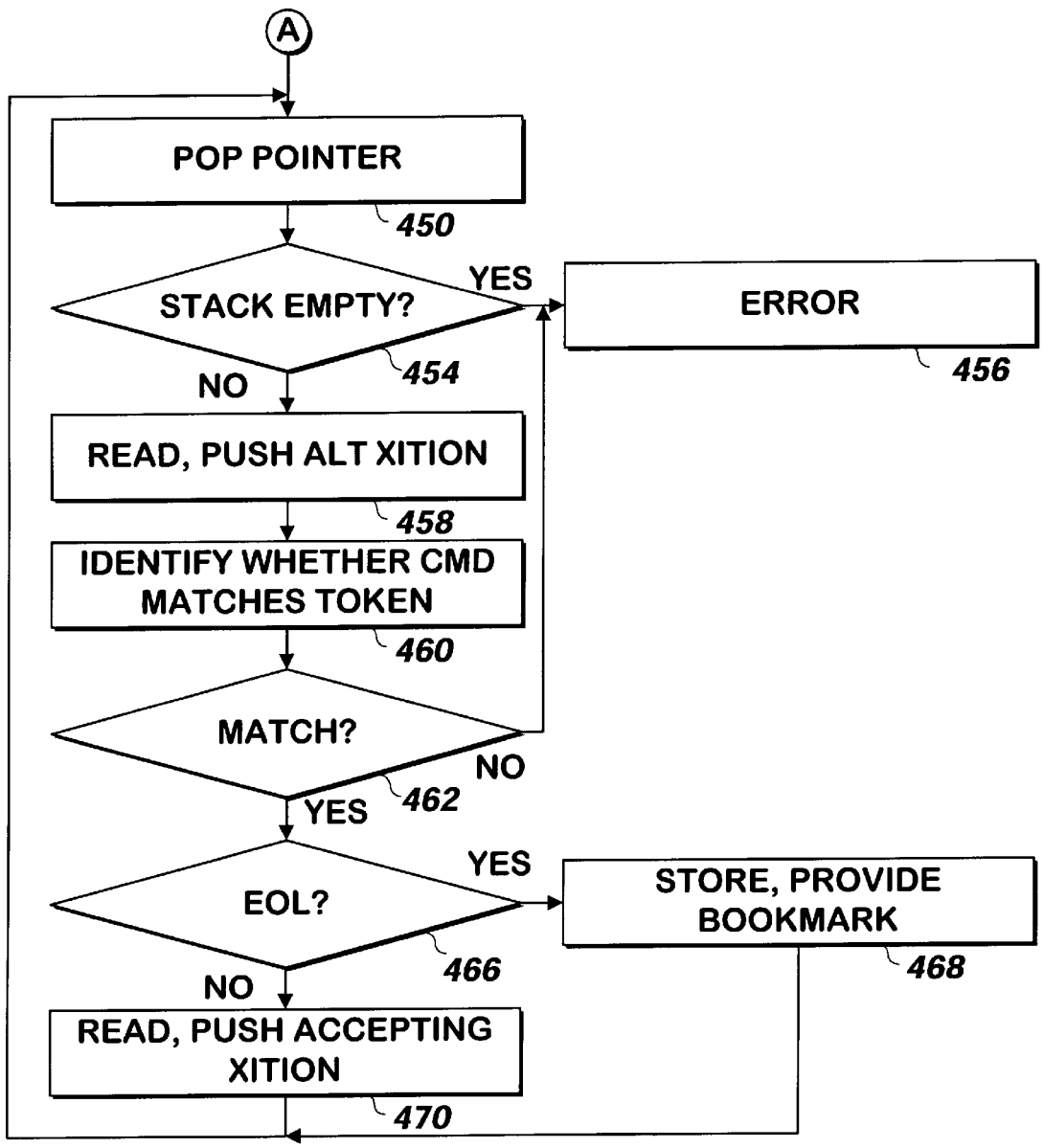
FIG. 4D is a flowchart illustrating a second portion of the method of parsing commands began in FIG. 4A or 4C according to an alternate embodiment of the present invention.

In one embodiment, no-alt nodes are detected and not pushed in steps 414 and 458 of FIGS. 4A through 4C. In such embodiment, detection of no alt nodes is not required at step 452. In such embodiment, step 452 is omitted and step 454 is performed in its place as shown in FIG. 4D. The other steps of FIG. 4D operate as described in FIG. 4B.

Referring again to FIG. 4B, if a match is determined to exist 456 and the node having the pointer popped in step 450 contains an EOL 464, one or more bookmarks corresponding to the EOL node are stored 468 and may be provided. In one embodiment, step 468 includes retrieving and providing an identifier of a function or procedure corresponding to the bookmark to execute in order to perform the action intended by the submitted command. Otherwise, the node having the pointer popped in step 450 is read to locate an accepting transition 470. The method continues at step 450.

What is claimed is:

1. An apparatus for identifying at least a similarity between at least a portion of a command submitted for execution comprising a plurality of tokens, and at least one of a first set of a plurality of acceptable commands comprising tokens, the apparatus comprising:

a user session storage having an input/output for receiving at the user session storage input/output storing and providing at the user session storage input/output a plurality of identifiers comprising tokens corresponding to the command submitted for execution and previously identified as at least similar to at least one of a second set of a plurality of acceptable command; and a token compare having a first input operatively coupled to receive at least a portion of the command submitted for execution, a second input coupled to the user session storage input/output for receiving at least one of the identifiers and an output having a first state responsive to at least one of the at least one tokens received at the token compare second input at least substantially similar to at least one of the tokens of the command submitted for execution received at the token compare first input.

2. The apparatus of claim 1, additionally comprising a sequence compare having a second input coupled to the user session storage output for receiving a second identifier of a second set of data corresponding to the second set of the plurality of acceptable commands substantially at the time the command submitted for execution was identified as corresponding to at least one of second set of the plurality of acceptable commands, a first input operatively coupled to receive a first identifier of a first set of data corresponding to the first set of plurality of acceptable commands, and an output having a first state responsive to the first and second identifiers indicating the first set of data is at least substantially similar to the second set of data.

3. The apparatus of claim 1, additionally comprising a function executor having a first input for receiving at least one of the at least one token of the command submitted for execution and a second input for receiving a set of data corresponding to the set of the plurality of acceptable commands, the function executor for comparing the at least one token of the command submitted for execution with at least a portion of the set of data and for providing at an output coupled to the user session storage input/output a token corresponding to the at least one token received at the function executor first input responsive to the token received at the function executor first input being at least similar to portion of the set of data received at the function executor second input.

4. The apparatus of claim 3:
   wherein:
      the token compare additionally comprises a signal input, and the token compare output is responsive to the token compare signal input;
      the function executor additionally comprises a third input for receiving an identifier of the portion of the set of data, and a fourth input for receiving a level identifier and the function executor output is responsive to the identifier received at the function executor third input and the function executor fourth input; and
   the apparatus additionally comprises:
      a stack having an input/output, the stack for receiving at the stack input/output, storing, and providing at the stack input/output at least one identifier of the set of data;
      a bookmark compare having a first input coupled to the sequence compare output and a second input coupled to the token compare output, the bookmark compare for, responsive to the bookmark compare first input, providing at a first output an indication that none of the tokens in the second command are at least substantially similar to at least one token, and, responsive to the second input, providing at the bookmark compare first output an indication that at least one of the tokens in the second command is at least substantially similar to a token and for providing at a second output coupled to the stack input/output an identifier corresponding to at least one of the tokens; and
      a parser having a first input coupled to the bookmark compare output, the parser for receiving at least one of the indications and at least zero of the identifiers, and a second input coupled to the stack input/output for receiving at least one of the identifiers, the parser for providing at a first output coupled to the function executor third input at least one identifier of the portion of the set of data responsive to the parser second input, and for providing at a second output coupled to the function executor fourth input a level identifier responsive to the parser first input.

5. A method of parsing at least two commands, comprising:
   identifying at least one action indicated by a first command submitted for execution;
   storing at least one identifier responsive to the identifying the at least one action indicated by the first command step; and
   identifying at least one action indicated by a second command responsive to the at least one identifier stored.

6. The method of claim 5, wherein:
   at least one identifier stored comprises a set of at least one token, at least one of said set of at least one token corresponding to at least one portion of the first command; and
   identifying at least one action indicated by the second command comprises comparing at least one of the tokens in the set to at least one portion of the second command.

7. The method of claim 6, wherein identifying at least one action indicated by the second command additionally comprises comparing at least a portion of the second command to at least one token not in the first set.

8. The method of claim 5, wherein:
   the identifying at least one action indicated by the first command step is responsive to a first version of a set of data;
   the storing at least one indication step comprises storing an identifier of the first version of the set of data; and
   the identifying at least one action indicated by a second command step:
      is responsive to a second version of the set of data;
      comprises comparing the identifier of the first version of the set of data with an identifier of the second version of the set of data; and
      is responsive to the comparing the identifier step.

9. The method of claim 8, wherein, responsive to the comparing step indicating the first version is at least substantially similar to the second version, the identifying at least one action indicated by the second command comprises comparing at least one of the tokens in the set to at least one portion of the second command.

10. The method of claim 8, wherein, responsive to the comparing step indicating the first version is not at least substantially similar to the second version, comparing at least a portion of the second command to at least one token not in the first set.

11. The method of claim 6, additionally comprising removing at least one pointer from a stack responsive to the comparing step.

12. The method of claim 7 additionally comprising pushing at least one pointer to the set of data responsive to the comparing at least a portion of the second command to at least one token not in the set step.

13. The method of claim 5 additionally comprising the step of storing at least one indication responsive to the identifying the at least one action indicated by the second command step.

14. A computer program product comprising a computer useable medium having computer readable program code embodied therein for parsing at least two commands, the computer program product comprising:

computer readable program code devices configured to cause a computer to identify at least one action indicated by a first command submitted for execution;

computer readable program code devices configured to cause a computer to store at least one identifier responsive to the identifying the at least one action indicated by the first command step; and computer readable program code devices configured to cause a computer to identify at least one action indicated by a second command responsive to the at least one indication stored.

15. The computer program product of claim 14, wherein:

at least one identifier stored comprises a set of at least one token, at least one of said set of at least one token corresponding to at least one portion of the first command; and the computer readable program code devices configured to cause a computer to identify at least one action indicated by the second command comprise computer readable program code devices configured to cause a computer to compare at least one of the tokens in the set to at least one portion of the second command.

16. The computer program product of claim 15, wherein the computer readable program code devices configured to cause a computer to identify at least one action indicated by the second command additionally comprise computer readable program code devices configured to cause a computer to compare at least a portion of the second command to at least one token not in the first set.

17. The computer program product of claim 14, wherein:

the computer readable program code devices configured to cause a computer to identify at least one action indicated by the first command are responsive to a first version of a set of data;

the computer readable program code devices configured to cause a computer to store at least one indication comprise storing an identifier of the first version of the set of data; and the computer readable program code devices configured to cause a computer to identify at least one action indicated by a second command:

are responsive to a second version of the set of data;

comprise computer readable program code devices configured to cause a computer to compare the identifier of the first version of the set of data with an identifier of the second version of the set of data; and are responsive to the computer readable program code devices configured to cause a computer to compare the identifier.

18. The computer program product of claim 17, wherein, responsive to the computer readable program code devices configured to cause a computer to compare indicating the first version is at least substantially similar to the second version, the computer readable program code devices configured to cause a computer to identify at least one action indicated by the second command comprise comparing at least one of the tokens in the set to at least one portion of the second command.

19. The computer program product of claim 17, additionally comprising computer readable program code devices configured to cause a computer to, responsive to the computer readable program code devices configured to cause a computer to compare indicating the first version is not at least substantially similar to the second version, compare at least a portion of the second command to at least one token not in the first set.

20. The computer program product of claim 15, additionally comprising computer readable program code devices configured to cause a computer to remove at least one pointer from a stack responsive to the computer readable program code devices configured to cause a computer to compare.

21. The computer program product of claim 16 additionally comprising computer readable program code devices configured to cause a computer to push at least one pointer to the set of data responsive to the computer readable program code devices configured to cause a computer to compare at least a portion of the second command to at least one token not in the set.

22. The computer program product of claim 14 additionally comprising computer readable program code devices configured to cause a computer to store at least one indication responsive to the computer readable program code devices configured to cause a computer to identify the at least one action indicated by the second command.

* * * * *